Figure 1:
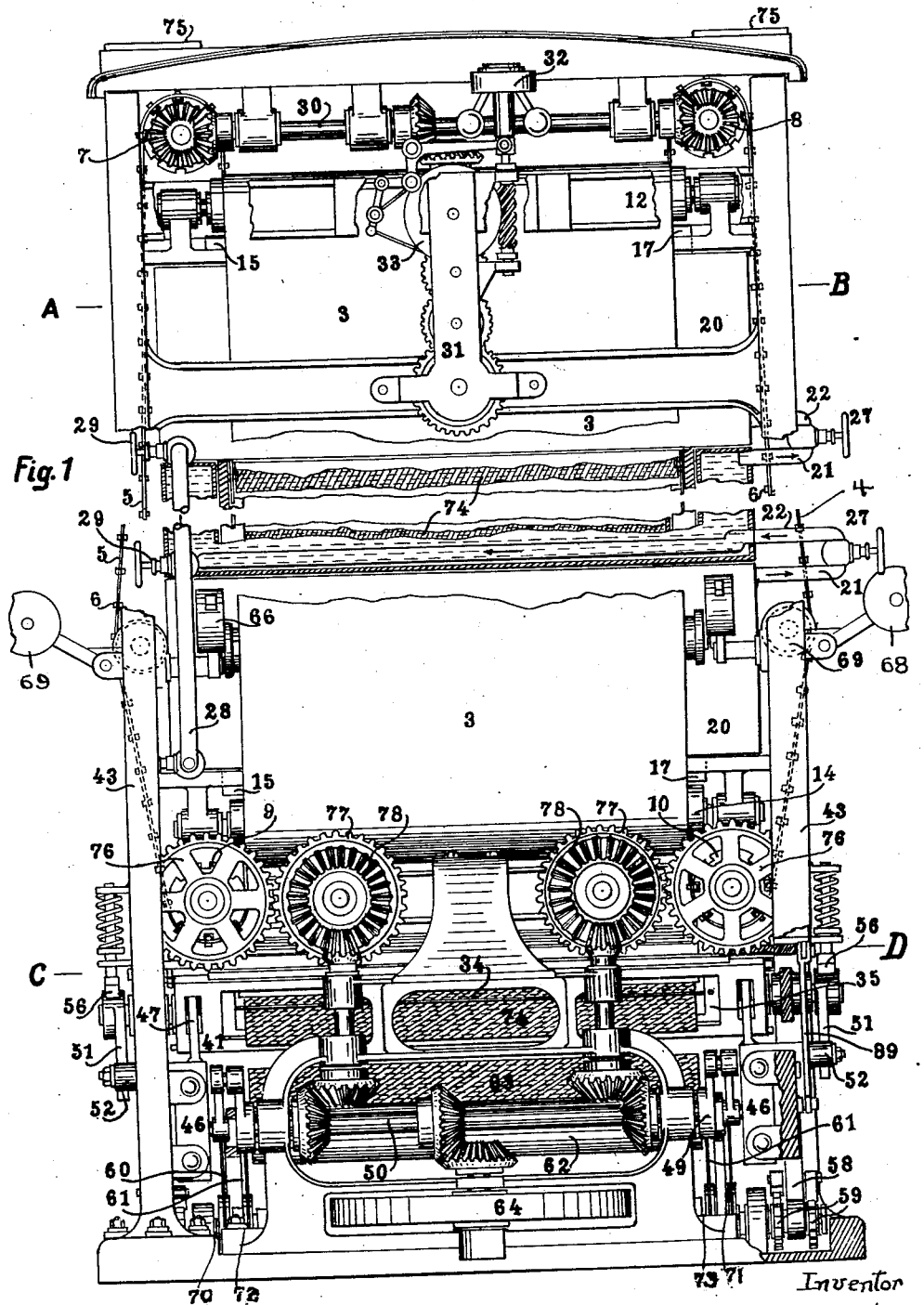

April 18, 1933. A. T. HÜNTEN 1,903,920
AUTOMATIC MACHINE FOR THE MANUFACTURE OF SOAP BARS
Filed July 7, 1931 7 Sheets-Sheet 3
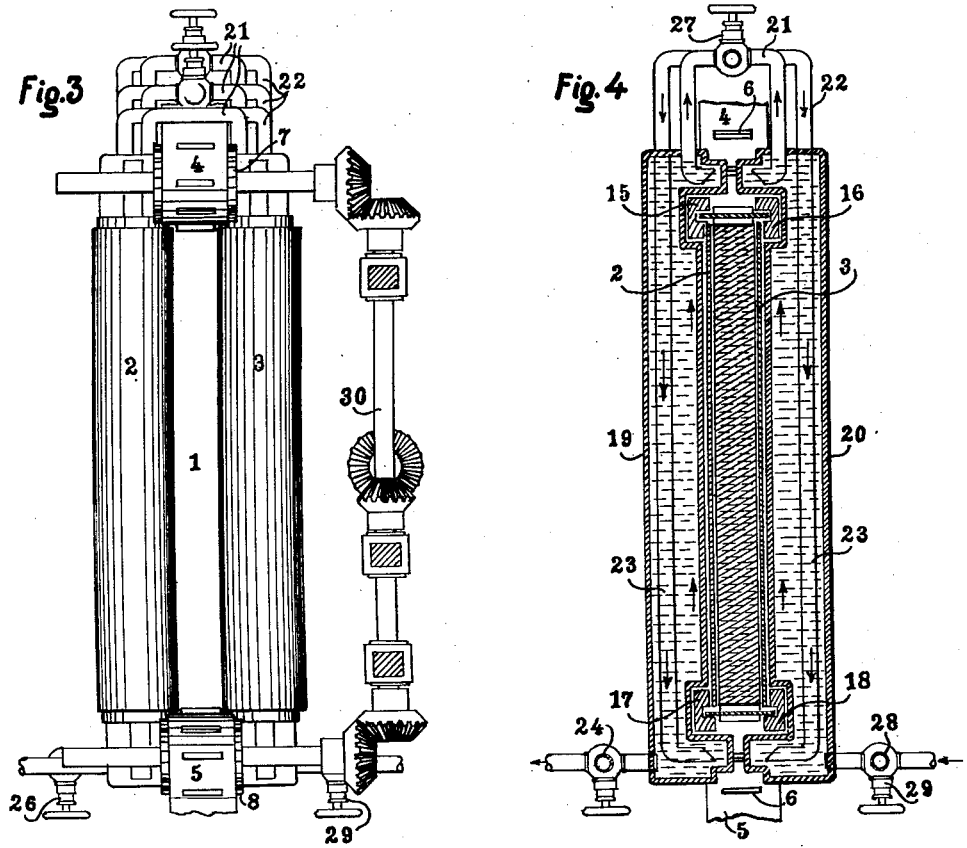
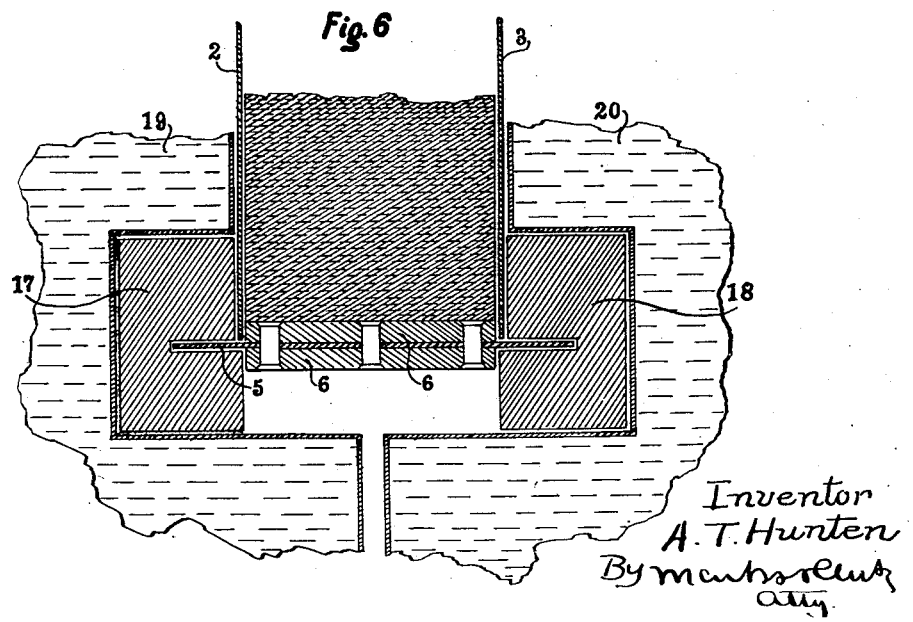

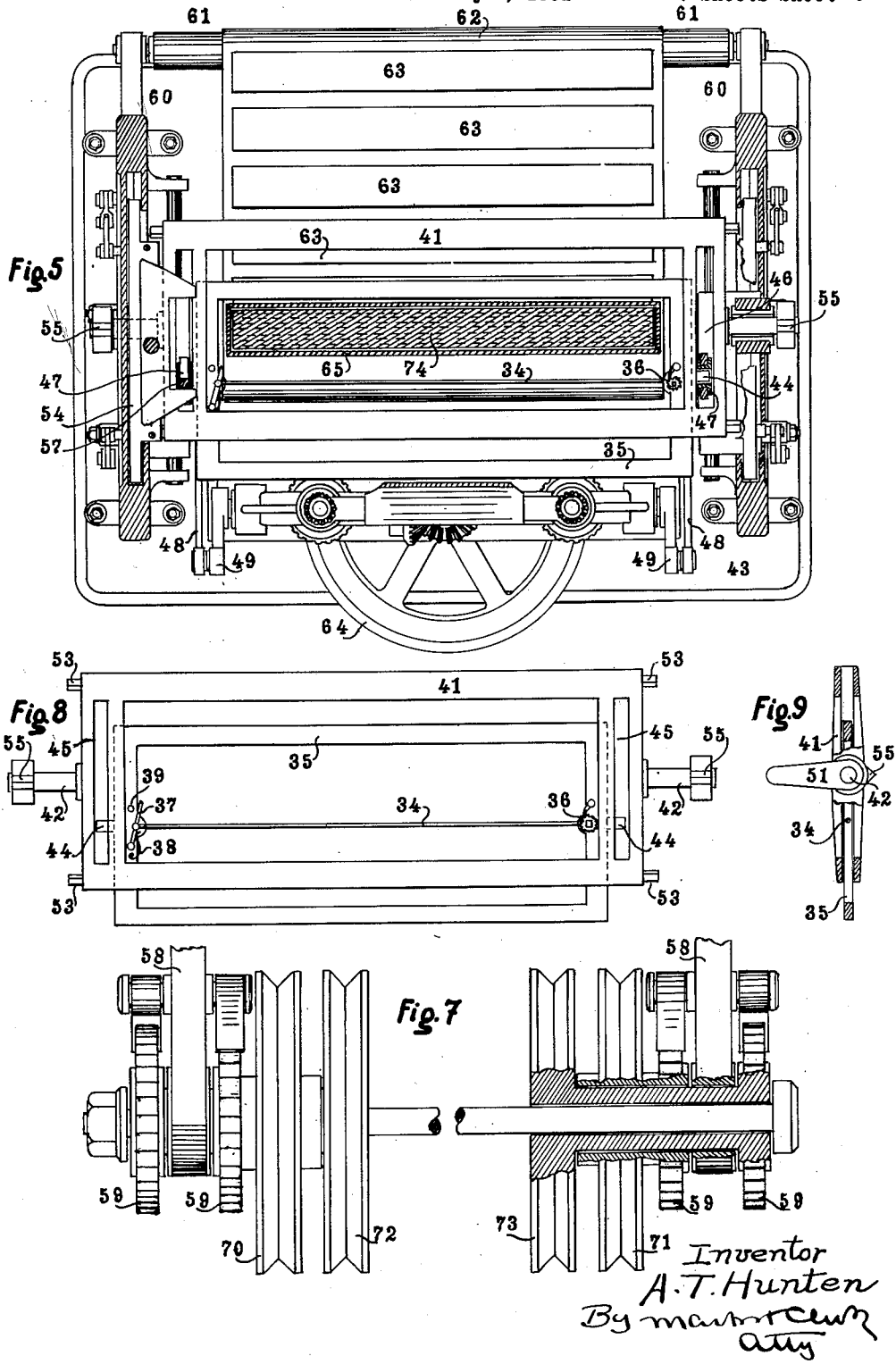

April 18, 1933. A. T. HÜNTEN 1,903,920
AUTOMATIC MACHINE FOR THE MANUFACTURE OF SOAP BARS
Filed July 7, 1931 7 Sheets-Sheet 5
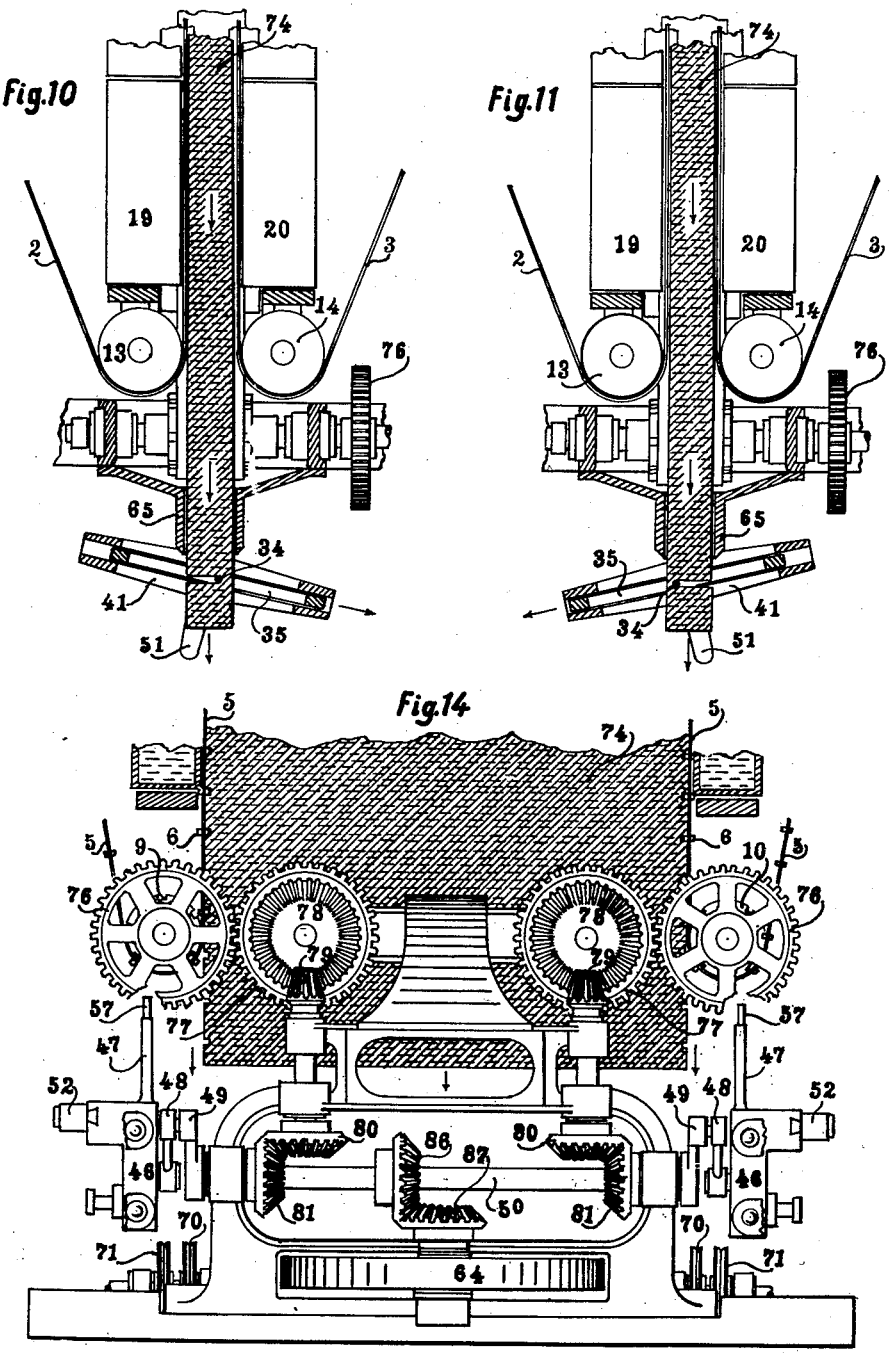

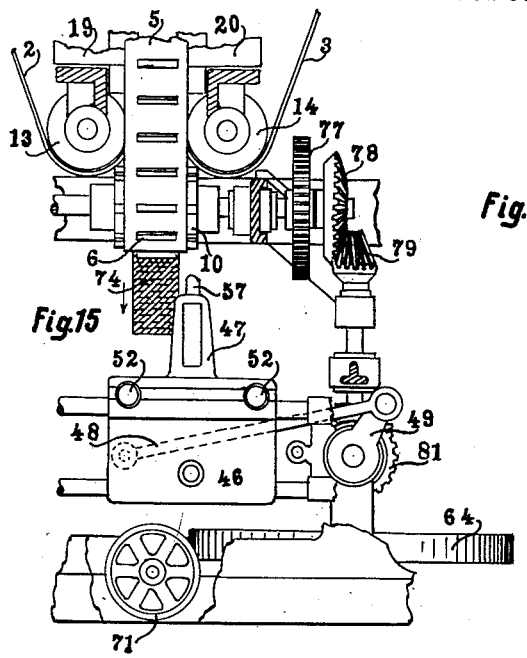
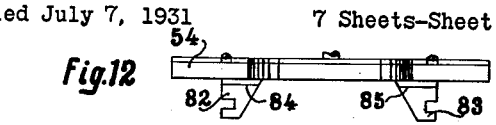
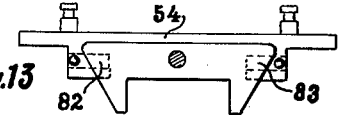
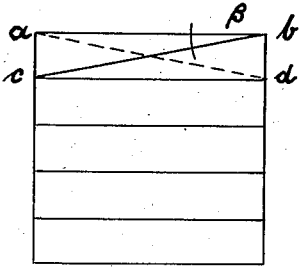
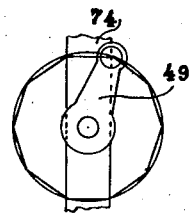
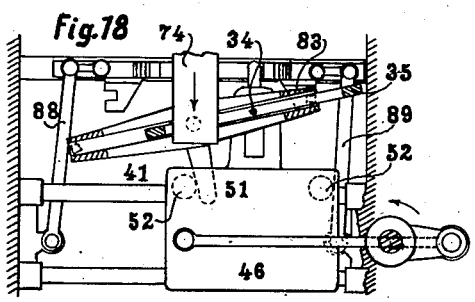
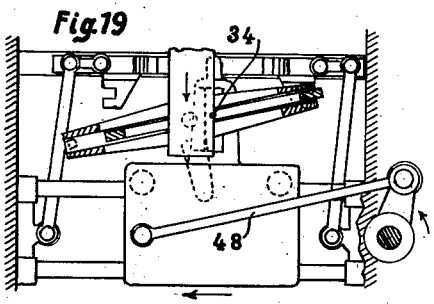
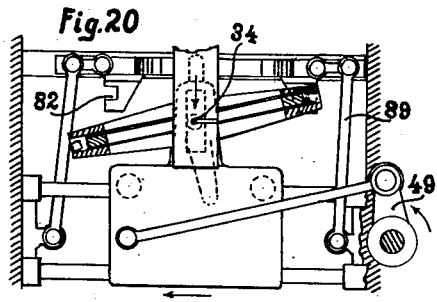
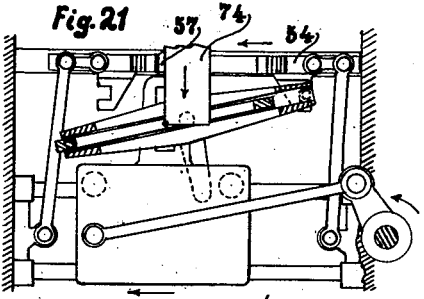

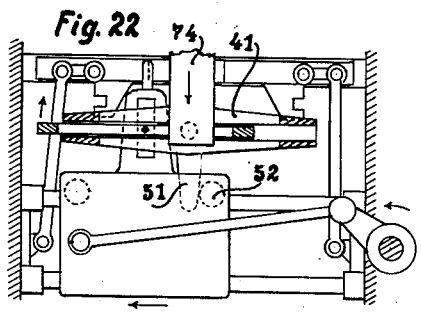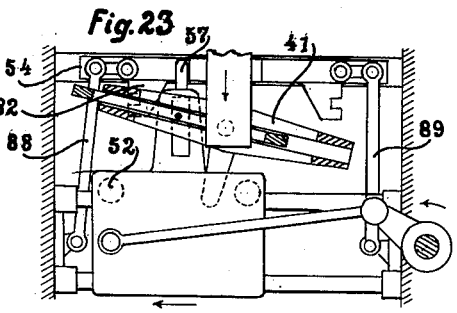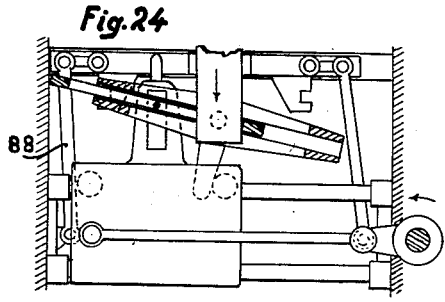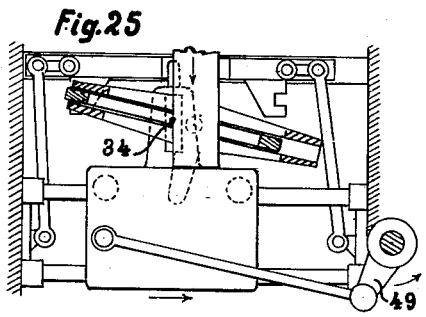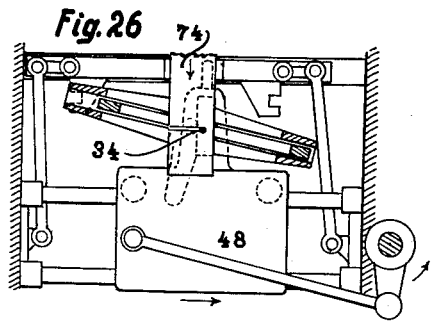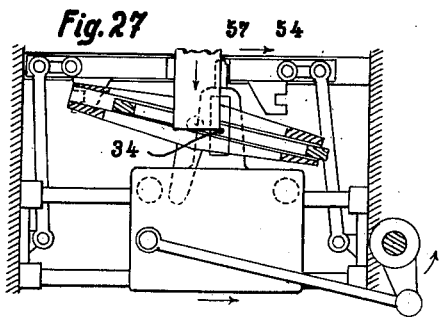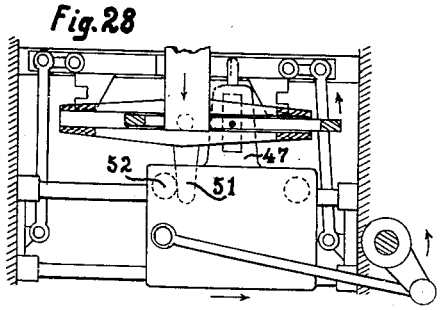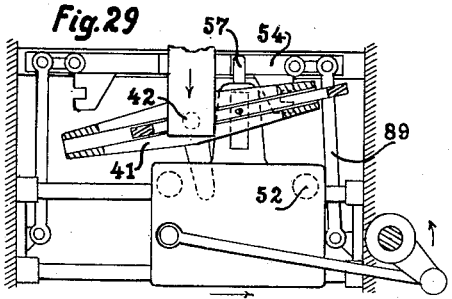

Patented Apr. 18, 1933

1,903,920

UNITED STATES PATENT OFFICE

ALFRED THEODOR HÜNTEN, DECEASED, LATE OF KOPPERN IN THE TAUNUS, GERMANY, BY GERTRUD HÜNTEN, WIDOW AND ADMINISTRATRIX, OF FRANKFORTON-THE-MAIN, GERMANY

AUTOMATIC MACHINE FOR THE MANUFACTURE OF SOAP BARS

Application filed July 7, 1931, Serial No. 549,258, and in Germany November 6, 1928.

For the purpose of cooling soap and to give it the shape of bars, in most cases of prismatic configuration, there has up to now been used a method consisting in conveying the hot and liquid soap under pressure into the usual soap cooling presses. In these presses the soap is transformed into quadrangular plates, and cooled down, and the cooled soap plates (generally after a cooling time of two hours) are withdrawn from the press by four workmen and then piled. It occurs frequently that the plates are not completely filled up; besides, that procedure requires much time. The soap plates not being completely cooled down have, for this reason, still a certain binding power and are adhesive, and they adhere to one another the more as they are subject to the weight of the pile. It is, therefore, necessary to pile them over again which requires, of course, additional labor. The plates can be cut into rods or bars only after they are cooled down completely.

The drawbacks mentioned have been overcome by the present invention which permits the carrying out of the entire procedure of forming the soap bars completely automatically. The completely cooled and cut bars leave the machine in regular intervals with the aid of a conveying band driven by the machine itself, and they are then further worked in the desired manner. The liquid soap is introduced into the machine from above and the soap leaves the machine in the form of finished bars. No manual work is necessary. Also no drive motor is necessary, because the natural weight of the soap present in the machine (about from 300 to 400 kg.) is sufficient to operate the machine.

There are in this machine four endless bands which are so arranged with respect to one another as to form between them a casting space of rectangular transverse section. The smaller bands are provided with transverse webs to grip the mass of soap so that the weight of this latter, under the action of the gravity, can reliably be transmitted to the bands.

One of the most difficult problems to be solved in this invention consisted in tightening or packing the continuously running bands especially at those places where they form the corners of the casting space. The bands may consist of any of the suitable materials. The reliable tightening or packing has been attained by guiding the bands in four tightening or packing ledges provided with grooves, whereby, also and especially under the co-action of the cooling vessels also forming parts of the machine, a sort of labyrinth packing is established. A tensioning device is provided, by means of which the bands are subjected to a strong tension so as to remain perfectly straight. Such a device is necessary also because of the different temperatures existing at different points of the soap.

The liquid soap is introduced into the casting space from above and is cooled in that space by means of cooling vessels provided outside the same, but adjacent to it. These vessels encompass the soap way and the soap is solidified under their action. The weight of the soap is transmitted to the bands by the transverse webs already mentioned. Such webs are provided on both sides of the bands, and the inner webs engage cog-wheel-like rolls by which the movement is transmitted to a power transmission gear, the speed of which can be regulated by a brake subjected to the influence of a governor, the speed being so determined, that the cooled soap leaves the lower end of the path formed by the bands, with a certain predetermined speed and in completely cooled state. When the soap has left the bands it passes over into a guide frame and below this frame it is cut into bars by means of a wire. The soap bars fall upon a conveying band moved automatically by the machine, and in this way they are conveyed out of the machine.

If for any reason the cutting wire should break, a lever or arm pressed upon that wire will be released and will close an electric circuit into which is inserted a device which when having been switched in stops the machine, so that the soap, including the liquid soap, will be retained in the machine.

As the cooled soap moves with the four bands uninterruptedly and uniformly also during the cutting operation, the cutting arrangement is such that the cuts are effected nevertheless properly rectangularly with respect to the longitudinal direction of the soap bar; in other words: the guide for the cutting wire is arranged at a certain angle, as will appear more distinctly from the following main part of the specification in which everything is treated in detail.

The guide member for the cutting wire can be moved forwardly and rearwardly. It is moved forwardly and locked when a cut is to be made, and it is unlocked and moved rearwardly when the cut has been effected. All these actuations are effected automatically.

The cooling vessels are connected with one another by tubes, and stop-cocks are inserted into these tubes. The cooling vessels may be connected with the tubes in such a manner that the water flows through them in a zig-zag way, but also any other desired way may be chosen, and the amount of the water can be regulated by the cocks or valves. There may also be provided a plurality of connecting tubes with cocks or valves and their arrangement may be such that the following possibilities are afforded:

(1) The fresh cooling water enters into the lowermost cooling vessel, passes through all of them in upward direction and leaves the machine at the uppermost cooling vessel.

(2) The fresh cooling water is distributed to the individual cooling vessels and is then led off directly from each thereof, and this procedure may be carried out, if desired, only with certain of the vessels, the other ones being used in any other manner.

Figure 2:
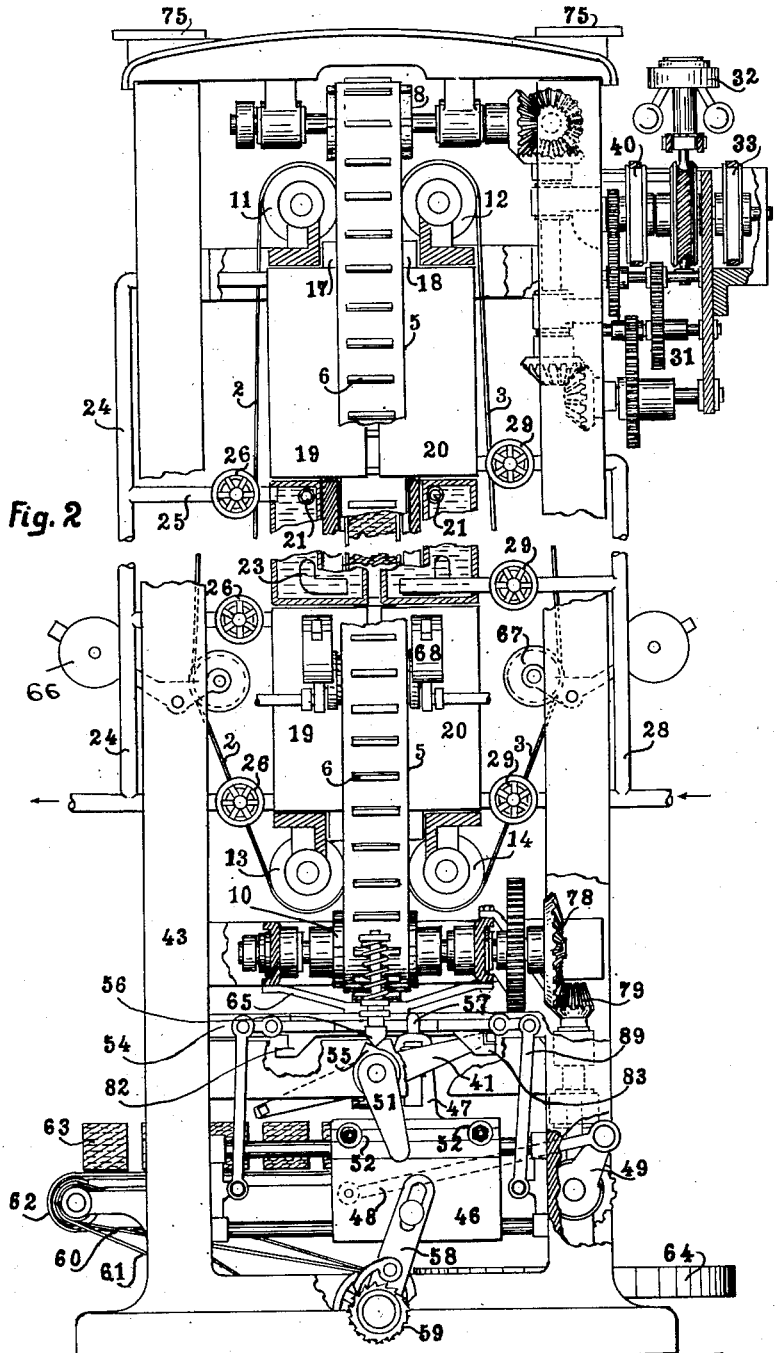

The invention is illustrated diagrammatically and by way of example on the accompanying drawings in which Fig. 1 is a fragmentary front-view of the machine a few parts being shown in section. Figure 2 is a fragmentary side-view of the machine with parts shown in section. Figure 3 is a plan, the bearings, the body of the machine, and the regulating device being omitted. Fig. 4 is a section in the plane A—B of Fig. 1. Fig. 5 is a section in the plane C—D of Fig. 1. Fig. 6 shows some details of Fig. 4 drawn to a greatly enlarged scale and relating to the means for guiding the bands and to the labyrinth packing mentioned in the introductory part of this specification. Figure 7 shows the driving means for the conveying band, partly in section. Figures 8 and 9 show in top plan and transverse section the guide frame with the cutting frame in it. Figs. 10 and 11 show details, in connection with the cutting means. Figs. 12 and 13 are two views of a locking slide. Figs. 14 and 15 show other details which illustrate how the machine is operated by the weight of the soap. Figs. 16 and 17 show further details intended to make clear how the transverse cut, at right angles, is attained, and Figures 18–29 show diagrammatically the individual phases of the cutting operation.

Referring to Fig. 3, 1 denotes the casting space which has rectangular transverse section and is formed by the four endless bands 2, 3, 4 and 5, the hot liquid soap being introduced into that space and cooled down therein. 6 are the transverse webs provided on the bands 4 and 5. These webs are provided on both sides of the two narrow endless bands 4 and 5. The outer webs 6 serve for holding the soap, the inner webs serve for transmitting positively the force of the weight of the soap. 7, 8, 9 and 10 are rolls contacting with said bands 4 and 5, and 11, 12, 13 and 14 are rolls contacting with the bands 2 and 3. The rolls 11–14 are shown best in Figs. 1 and 2. 15, 16, 17 and 18 (Figs. 1, 2, 4 and 6) are guiding and tightening rods provided with grooves in which the endless bands 4 and 5 run. Also the endless bands 2 and 3 are guided in rods or ledges 15, 16, 17 and 18, as shown in the Figs. 4 and 6.

Between opposed portions of the endless bands 2—5 are located the cooling vessels 19 and 20 which are so arranged that they tightly enclose those parts of the bands which form the casting space 1. Said cooling vessels are connected with one another by a plurality of tubes; the tubes 21 serve as overflow tubes and the tubes 22 serve as supply- and connecting tubes. 23 are extensions of the supply tubes 22; they extend into the cooling vessels 19 and 20 and their effect is this that the cooling water is positively compelled to rise in a zig-zag line whereby a highly effective and uniform cooling action is obtained. 24 denotes a discharge pipe for the hot water. All cooling vessels 19 and 20 have discharge branches 25 which communicate with the discharge tube 24 and can be shut by a cock or valve 26. Also the connecting tubes 21 and 22 are connected with one another through the intermediary of valves or cocks 27. 28 is a pipe for the supply of fresh cooling water to each of the vessels 20, and 29 is a cock or valve for closing this pipe.

In order that the weight of the soap is uniformly transmitted by the endless bands 4 and 5, the rolls 7 and 8 are coupled with one another by means of a shaft 30 provided with bevel-wheels. This shaft drives also a cog-wheel gearing 31 provided with a governor 32 that acts upon a brake 33.

The long bar 74 of the cooled and solidified soap leaving the endless bands at the lower end of the path formed between them must now be cut into suitably short pieces constituting the soap bars proper. The cutting is effected by means of the wire 34 which is kept under a suitable tension. It is located in a frame 35 in which it is kept under said tension by means of a ratchet-wheel 36 (Fig. 5) and a contact lever 37, by which parts a spring 38 is kept under tension. If the wire should break for any reason, the lever 37 will be thrown back and will contact with the pin 39 whereby an electric circuit will be closed and a brake 40 (Fig. 2) will be actuated so that the machine is stopped and also the further supply of the liquid soap ceases. The brake can be actuated also by hand.

In lieu of said brake or together with it also a spring-actuated locking bolt or a similarly operated hook or the like may be used.

The cutting wire frame 35 is slidable in a separate guide frame 41 having on each side a pivot 42 with which it is turnably supported in the frame 43 of the machine.

As appears especially from Figs. 10 and 11 the guide frame 41 which is arranged in a suitable oblique position guides the cutting wire 34 towards and against the soap bar 74 through the intermediary of the cutting frame 35, the angle being so determined that the resulting cut extends at right angles through the soap bar, it being understood that this bar continues to move on while the cutting takes place. This will become more apparent by reference to Figs. 16 and 17. In Fig. 16, $a, b, c$ is a right-angled triangle, the cathetus $a, b$ of which corresponds to the thickness of the soap bar to be cut through. The hypothenuse $b, c$ corresponds to the length of the path of the cutting wire 34, whereas the cathetus $a, c$ corresponds to the extent of movement of the long soap bar during that time in which the cutting wire covers the distance $b—c$. The angle of the obliquity of the guide frame is equal to the angle $\beta$ of the triangle $a, b, c$ of Fig. 16.

The crank circle of the crank 49 (Fig. 17) may, for instance, be chosen so large that the path of movement thereof is ten times greater than the distance it is required to cover to cut through the soap. At every revolution of the crank 49 two soap bars proper are cut off from the long bar issuing from the endless bands, and therefore the first half of the circular path of the crank corresponds with one cut and the other half with a second cut. However, as only one-fifth of each half turn of the crank is required to effect the cutting of the soap, the remaining four-fifths of this crank movement is used for the actuation of the feeding members pertaining to the cutting device, or forming parts thereof respectively. As during the cutting the long soap bar descends a distance $a, c$, it has descended after one half revolution of the crank 49 five times the length $a—c$. In the constructional example shown in Fig. 16 this length (five times $a—c$) is, however, equal to the length of cut $a—b$, so that a square piece of soap is cut off from the long bar 74. I also mention that the ratio in the cog-wheel gearing is so chosen that the crank 49 has covered one tenth of its way when the soap 74 has moved downwardly the distance $a—c$.

For obtaining transverse sections of any desired height, a suitable ratio between the cog-wheels 76 and 77 must be chosen, and in the locking slides 54 the locking hooks 82 and 83 with their bounding faces 84 and 85 must be made adjustable in their height relatively to the axle 42 of the guide frame 41 in the locking slide 54, as with a changed transverse section the line $a—c$ in Fig. 16 becomes longer so that also the angle $\beta$ becomes larger.

The locking or checking slide 54 is illustrated separately in Figs. 12 and 13. In these figures 82 and 83 are the locking or checking hooks and 84 and 85 are the bounding faces, the purpose of which is to limit the stroke of the guide frame 41, that is to say, the oblique position of the same.

The cutting frame 35 has on both sides pins 44 by which it can be moved to and fro. Said pins extend into slots 45 provided in both sides of the guide frame. Below said slots the sliding pieces 46 with the recesses 47 are arranged, and the pins 44 of the cutting frame 35 engage these recesses. The movement of the sliding pieces 46 is effected by the connecting rods 48 and the cranks 49 which latter are secured to the auxiliary shaft 50. The guide frame 41 is provided with depending tipping-over levers 51 (Fig. 2) which are actuated by the pins 52 of the sliding members 46. At the four corners of the guide frame 41 are the four locking or checking pins 53 which are seized by the hooks of the two checking slides 54. The guide frame 41 is thereby locked or checked in its oblique position. The pivot 42 of the guide frame 41 carries prismatic members 55 which are subjected to a yielding pressure exerted by counter prismatic members 56. The sliding members 46 above the recesses 47 are also provided with feeding or conveying pins 57 by which the checking slides 54 are operated.

The auxiliary shaft 50 is driven by means of cog-wheels from the shafts of the rolls 9 and 10.

The various phases of the cutting operation are illustrated in Figs. 18–29. In Fig. 18 the crank 49 is in its dead-centre position and the checking slide 54 is in its extreme outer position in that the pin 52 has pushed against the lever 89, so that the checking hooks 83 hold the guide frame 41 checked. The cutting frame 35 with its cutting wire 34 is also in its extreme outer position. The soap mass has descended by three part steps ($a, c$, Fig. 16).

In Fig. 19 the cutting wire 34 is just about to cut the soap. The soap mass 74 has descended by three steps $a, c$ more. In Fig. 20 the soap has been cut through for about half its thickness. In Fig. 21 the cut is finished. The cut-off piece of the soap has fallen down and the soap mass has again descended by the distance *a—c*. The pin 57 engages the checking slide 54 and shoves it rearwardly.

Fig. 22: The locking of the guide frame has been released. The pin 52 contacts with the tipping-over lever 51 and has turned the guide frame through the intermediary of said lever beyond its middle position, whereby also the prismatic members 55 and 56 are actuated. These members are not shown in the Figs. 18–19, but they are illustrated in the Figs. 1 and 2 and they act under the influence of the spring actuated member 56 to snap the guide frame into its oppositely inclined position.

Fig. 23: The guide frame has been turned, as just stated, and the pin 52 contacts with the lever 88, in consequence whereof the locking slide 54 is moved rapidly to lock the guide frame in its new position. The soap mass has descended by two more distances *a—c*.

Fig. 24 shows the following dead-point position of the crank 49, as well as the reversal of movement of the sliding piece 46.

The Figs. 25 and 29 show the further positions of the parts concerned relatively to one another.

The transmission gear for utilizing the weight of the soap mass 74 is illustrated in Figs. 14 and 15. The soap mass which is shown in transverse section descends vertically in the direction of the arrows and its weight is transmitted by means of the transverse webs 6 provided on the bands 5 to the rolls 9 and 10 and further to the cog-wheels 76 and 77. To the shafts of the cog-wheels 77 are affixed bevel-wheels 78 which rotate the crank 49 through a train of gear wheels 79, 80 and 81. The connecting rod 48 moves the slides 46 with their recesses 47, as well as the pin 57 for operating the locking or checking slides 54. The members 47 pass through the slots 45 provided in the guide frame 41 and engage here the pins 44 that extend into the slots 45 and are located on both sides of the cutting frame, whereby the movement of the slide 46 is transmitted to the cutting frame and the cutting wire therein, irrespective of the oblique position of the guide frame 41.

The reciprocating movement of the member 46 is utilized to operate the conveying belt 62, the operation of the latter being effected by means of a double acting ratchet lever 58 coacting with ratchet wheels 59. Cords or belts 60 and 61 are utilized to transmit the rotary movement of the ratchet wheels 59 to the conveying band 62.

64 is a fly-wheel to render the operation of the machine smooth. 65 is a guide passage provided in the machine body for the cooled soap in order to facilitate the cutting thereof into said pieces 63.

66, 67, 68 and 69 are tensioning devices for the endless bands 2, 3, 4 and 5, and 70 and 71 are cord pulleys which are driven by the respective ratchet-wheels 59 and serve for driving the conveying band 62; the cord 61 running over said pulleys are open, whereas another cord 60 running over cord pulleys 72 and 73 is crossed.

The manner of operation of the cutting device is as follows:

The cutting frame is moved to and fro by means of the sliding members 46, the slotted links 47 and the pins 44, and a piece of soap is cut off from the long soap bar at every reciprocation. As the long soap bar descends continually during the cutting operation, the guide frame 41 is moved into correspondingly oblique positions by means of the tipping-over lever 51 (Fig. 2) for the purpose of obtaining a proper transverse cut, as has already been fully described. The stroke of the sliding members 46 is chosen considerably larger than is requisite for cutting off the pieces of coap, and the periods between cuts is used to tip over the guide frame 41 at the suitable moment and to lock it by means of the conveying pins 57 and the locking slide 54. The speed of the tilting movement of the guide frame 41 is increased by the prismatic members 55 and 56, whereby the locking thereof is rendered possible.

As appears from the detailed statements in this specification, the hot and liquid soap mass is introduced from above into the chamber or space 1 (Fig. 3). Special supports 75 are provided on the machine body for attaching to this latter the requisite pipes and, if necessary, also a stirring device (for instance in a case, in which a fat or a chemical substance is to be added to the soap mass) may be attached. Mention may be made here of the fact that the present invention presents the possibility to manufacture a high-grade fat-soap as the possibility is afforded to introduce a suitable fat or suitable fats or the like, as well as one or more suitable chemical substances, in any desired amount.

When starting the machine a tightly closing bottom is loosely inserted into the upper part of the machine between the webs 6, and thereafter the machine is started either manually with the aid of a crank or a motor is used for this purpose. When the machine has been started, the motor is switched off, because thereafter the weight of the soap mass is used as driving power, as already stated. Auxiliary means for starting the machine have not been shown in the drawings. The starting is, however, continued until the amount of the soap mass introduced into the machine is large enough so that its weight is sufficient to act as driving power for keeping the machine in operation. When the above-mentioned inserted bottom has arrived in the lower part of the machine, it is removed from the same and from this moment the machine is able to run automatically. The height of the machine depends upon the dead weight of the soap mass, also upon the daily output desired.

I claim:

1. An automatic machine for the manufacture of soap bars, comprising, in combination, four endless bands forming between them a space for the reception of hot liquid soap mass, cooling means arranged between the bands, guiding members located at the corners of the space formed by the bands and having grooves therein receiving portions of the bands to form labyrinth packings.

2. A machine for the automatic manufacture of soap bars, comprising, in combination, four endless bands forming between them a path for the reception of hot liquid soap mass, transverse webs on two oppositely located of said bands; guide ledges for said bands, and means for rendering said path tight; a plurality of cooling vessels adjacent to the said bands, pipes connecting said vessel with one another, and valves in said pipes, these latter and the valves being so arranged that the cooling water may be caused to flow through said vessels in succession or through pairs of them and in either case in a zig-zag path.

3. A machine for the automatic manufacture of soap bars, comprising, in combination, four endless bands forming between them a path for the reception of hot liquid soap mass, a driving gear, transverse webs on both sides of two oppositely located of said bands adapted to transmit the weight of the soap mass to said driving gear, braking means co-operating with said driving means, and a governor co-operating with said braking means; gear for rendering said path tight; a plurality of cooling vessels adjacent to said bands, pipes connecting said vessels with one another, and valves in said pipes.

4. A machine for the automatic manufacture of soap bars, comprising, in combination, four endless bands forming between them a space for the reception of liquid soap, guide ledges for said bands, and means for rendering said space tight; a plurality of cooling vessels adjacent to said bands, pipes connecting said vessels with one another, and valves in said pipes, said pipes and said valves being so arranged that the cooling water may be caused to flow through the said vessels either in succession or in pairs and in either case in a zig-zag path; a cutting device arranged at the end of said space in an oblique position, the angle of obliquity being such that a proper transverse cut through the cooled and solid soap mass is attained irrespective of the continued movement of the same, substantially as set forth.

5. A machine for the automatic manufacture of soap bars, comprising, in combination, four endless bands forming between them a space for the reception of liquid soap, guide ledges for said bands, and means for rendering said space tight; a plurality of cooling vessels adjacent to said bands; a cutting device for severing off pieces of soap from the long cooled and solid strand; and means to utilize the weight of the soap mass for operating said cutting device, substantially as set forth.

6. A machine for the automatic manufacture of soap bars, comprising, in combination, four endless bands forming between them a space for the reception of liquid soap; guide ledges for said bands, and means for rendering said space tight; a plurality of cooling vessels adjacent to said bands; a cutting device comprising a cutting wire, guides for the wire, means for moving the wire and its guide means into an oblique position, and means actuating said last-mentioned means.

7. A machine for the automatic manufacture of soap bars, comprising, in combination, four endless bands forming between them a space for the reception of liquid hot soap mass; guide ledges for said bands, and means for rendering said path tight; a plurality of cooling vessels located adjacent to the said bands; a cutting device for severing off bars of soap from the cooled and solid soap strand, this device comprising a cutting wire, means for guiding said wire, means for adjusting the guiding means in oblique position, and means for locking the guiding means after every adjustment, substantially as set forth.

8. A machine for the automatic manufacture of soap bars, comprising, in combination, four endless bands forming between them a path for the reception of liquid hot soap mass; means for holding said bands in tightened state; means for rendering said path tight; a plurality of cooling vessels adjacent to the said bands adapted to cool the soap mass present in said space; pipes connecting said vessels with one another, and valves in said pipes, said pipes and the valves being so arranged with respect to the said vessels, that the cooling water may be caused to flow through the vessels either successively or through pairs of them and in either case in a zig-zag path, substantially as set forth.

9. A machine for the automatic manufacture of soap bars, comprising, in combination, four endless bands forming between them a path for the reception of liquid hot soap mass; means for rendering said path tight; a plurality of cooling vessels arranged adjacent to said bands; and a cutting device for severing off bars of soap from the cooled solid soap strand, said device comprising a cutting wire, guide members for the same, tipping members for said guide members, prismatic operating members and elastic counter prismatic members, the prismatic members acting to accelerate the speed of the guide members.

10. An automatic machine for the manufacture of soap bars, comprising, in combination, four endless bands forming between them a path for the reception of hot liquid soap mass; guide ledges for said bands, and means for rendering said path tight; a plurality of cooling vessels arranged in close proximity to said path to cool the hot soap mass; a cutting device for severing off bars of soap from the cooled, solid soap mass, said device comprising a cutting wire, guide members for the wire adapted to be moved into an oblique position and to be tipped, and slotted links connected with said guide members and serving for moving it, substantially as set forth.

11. An automatic machine for the manufacture of soap bars, comprising in combination, four endless bands forming between them a path for the reception of hot liquid soap; a plurality of guide ledges for said bands, and means for keeping said path tight; a plurality of cooling vessels adapted to cool the hot soap mass present in said path; a conveying band for the soap bars severed off from the cooled solid soap strand, and means for operating this band automatically by the machine, the last mentioned means comprising a ratchet-wheel gearing including a ratchet lever and means for imparting an intermittent movement to said band from said lever.

12. A machine for the automatic manufacture of soap bars, comprising, in combination, four endless bands forming between them a path for the reception of hot liquid soap, guide ledges for said bands and means for keeping said path tight; cooling means arranged in close proximity to said bands to cool the soap mass present in said path; a cutting device for severing off bars of soap from the cooled solid soap strand, said device comprising a wire as cutting member proper, means for holding it, means for guiding it, and means for keeping it under tension; a lever forming a part of the latter means, a spring tensioned by said lever and adapted to withdraw it quickly in case said wire should break; a circuit into which said lever is inserted, and a contact pin forming also a part of the circuit, this latter being closed when the lever and the pin contact with one another; and means actuated when the circuit is closed and adapted to stop the machine, substantially as set forth.

In testimony whereof I affix my signature.

GERTRUD HÜNTEN,
*Widow and Administratrix of the Estate of Alfred Theodor Hünten.*